March 21, 1961 W. C. KLANK, JR 2,975,793
LIQUID STORAGE TANK
Filed Sept. 8, 1959
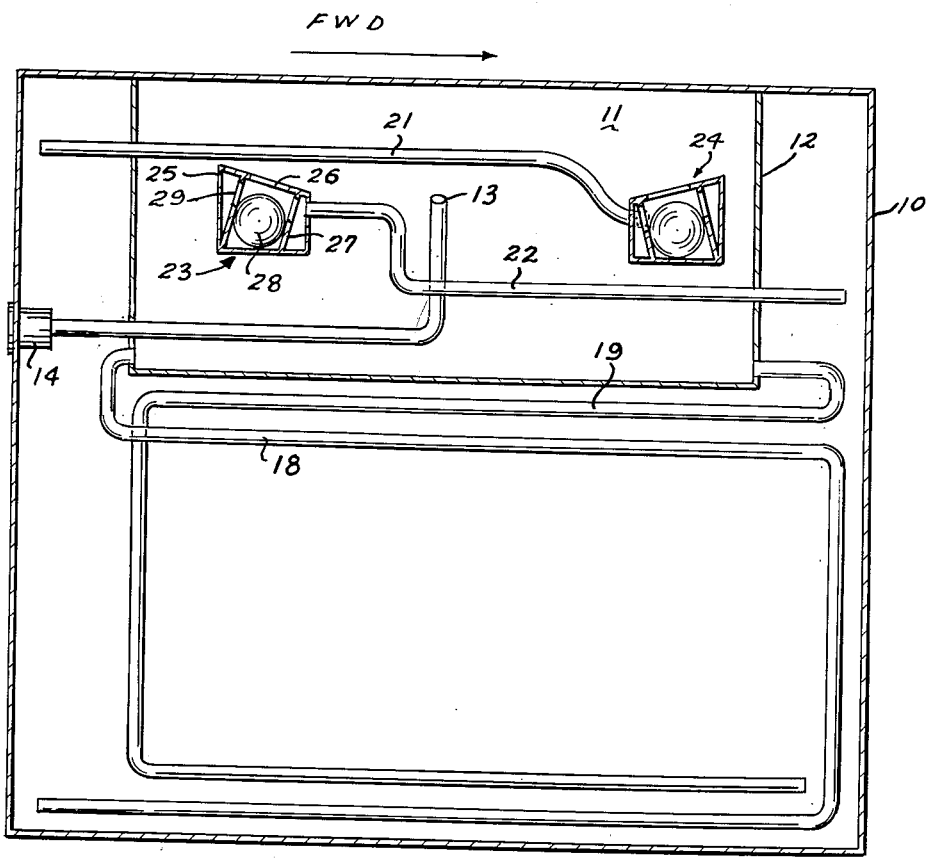
INVENTOR.
WALTER C. KLANK, JR.
BY
HIS ATTORNEY

United States Patent Office 2,975,793
Patented Mar. 21, 1961

2,975,793
LIQUID STORAGE TANK

Walter C. Klank, Jr., Dayton, Ohio, assignor to United Aircraft Products, Inc., Dayton, Ohio, a corporation of Ohio Filed Sept. 8, 1959, Ser. No. 838,751

3 Claims. (Cl. 137—43)

This invention relates to tanks storing a liquid and useful in vehicles such as aircraft wherein the tank assumes varying attitudes relative to the earth's surface in correspondence with the movements of the aircraft. While not so limited, the invention has especial application to oil supply systems in aircraft wherein an oil is taken from the tank to a place of use and then returned to the tanks for storage and subsequent reuse.

In tanks and systems as described, the oil returning to the tank is accompanied by large amounts of air. It is a design objective to provide for the rapid and efficient release of such air from the tank.

A general object of the invention is to provide a new vent system in a tank as described particularly characterized by means restricting the escape of liquid from the tank by way of the vent system in and during movement to changing tank attitudes, particularly attitudes in excess of a 90° climb attitude and in excess of a 90° dive attitude.

Another object of the invention is to present a new vent system for use in tanks as described characterized by means restricting an escape of liquid through the vent system not only in inverted flight and under conditions of negative gravity but also in climb and dive attitudes of predetermined extent.

Other objects and structural details of the invention will appear from the following description when read in connection with the accompanying drawing, which is:

A diagram of a tank having a vent system in accordance with the illustrated embodiment of the invention embodied therein, a showing of liquid movements to and from the tank being omitted.

Referring to the drawing, the diagrammatic illustration of the invention omits, as noted, any showing of liquid flow to, through and from the tank. It will be understood, however, that the illustrated system is a part of a tank which incorporates an inlet for admitting a mixture of air and liquid and an outlet for discharge of the liquid and which may include other controls and features relating to the liquid system as distinguished from the vent system. The incoming air and liquid is separated within the tank, the air rising above the liquid level where it is enabled to communicate with a vent system and permitted passage to the tank exterior.

As indicated in the drawing, a liquid storage tank of the kind with which the invention is concerned may comprise a substantially continuous shell 10 having a liquid inlet and a liquid outlet both not here shown and a vent system for conducting overboard of the tank air admitted to the tank with the returning liquid. This vent system includes a vent chamber 11 formed in the normal upper portion of the tank shell interior by wall means 12 in conjunction with the upper wall of the tank shell proper. The term "normal upper portion" is used to identify that part of the tank shell which is uppermost in a normal flight attitude. Similarly, the lowermost part of the tank shell in a normal flight attitude may be considered to be the normal lower portion of the tank shell. The motion of the tank shell is essentially unidirectional so that one end of the tank shell interior may be considered the forward portion and the other end the rearward portion, these portions being identified herein by reference to the directional arrow and notation "FWD" as placed over the tank illustration to be a part of the drawing.

The interior of the chamber 11 is vented to the tank shell exterior by a tube 13 which at its one end communicates with the vent chamber interior at a central point therein, the tube extending from the vent chamber to a fitting 14 installed in the tank shell. Communicating with the bottom of vent chamber 11, at the rear thereof, is one end of a tube 18 which traverses the tank in a longitudinal sense twice in extending from the vent chamber, terminating at its opposite end in the normal lower portion of the tank shell interior in the rearward portion thereof. Thus, the tube 18 connects the vent chamber 11 at what may be considered the rearward portion thereof with the normal lower portion of the tank shell in the rearward portion thereof. A tube 19 in similar manner connects the bottom of the vent chamber, at the forward end thereof, to the normal lower portion of the tank shell at the forward end thereof, being formed in a like circuitous fashion.

The normal upper portion of the tank shell interior is connected to the vent chamber 11 through tubes 21 and 22 which have outer ends terminating respectively beyond the ends of the vent chamber in the rearward and forward ends of the tank shell interior. Within the vent chamber the tubes 21 and 22 overlap and terminate within the chamber respectively in forward and rearward portions thereof. The inner ends of the tubes 21 and 22 communicate with the vent chamber through valve assemblies 23 and 24 which are identically constructed so that a description of one will suffice for both. Thus, each valve assembly comprises an outer cage 25 stationarily mounted in the vent chamber and having in its upper end an opening 26. A cylindrical valve guide 27 is in the cage 25 in concentric relation to the opening 26. The upper ends of the valve assemblies 23 and 24 slope downward toward one another to place the respective openings 26 and the respective concentric guides 27 at predetermined convergent angles. The cage of valve assembly 24 is adapted to receive the inner end of tube 21 and the guide in valve assembly 24 is formed with a radial series of openings 29 by which the tube 21 may communicate with the interior of the valve guide and through the opening 26 with the interior of the vent chamber 11. Similarly, the cage of valve assembly 23 receives the inner end of the tube 22 and the cylindrical valve guide therein is formed with openings 29 to communicate the tube 22 with the interior of the vent chamber through the cylindrical guide and opening 26.

The mode of operation of the vent system will largely be self-evident from the foregoing description and from the drawing. Briefly, however, the tubes 18 and 19, as one of their functions, provide for venting of the tank shell interior under conditions of an inverted tank or under conditions of negative gravity in which the contained liquid rises to the normal upper portion of the tank shell interior. Also, they serve as drains to return to the tank shell interior liquid that may be admitted to the vent chamber 11 through any of the several tubes during changes in tank attitude. By reason of the circuitous configuration defined by the tubes liquid flow from the tank shell interior into the vent chamber through these tubes is inhibited.

The tubes 21 and 22 communicate the interior of vent chamber 11 with the normal upper portion of the tank shell interior. In normal upright attitudes as illustrated, both ball valves 28 are in a position of rest on the bottom of their respective cages 25 so that free communication between the vent chamber and the tank proper is possible through the tubes 21 and 22. In an inverted position of the tank, or under conditions of negative gravity, the ball valves of the respective assemblies close. A flow of liquid into the vent chamber through the tubes 21 and 22 thereby is prevented. The ball valves respond individually to longitudinal tilting motions of the tank. Thus, a limited downward tilting movement of the tank of predetermined extent enables the gravity responsive ball 28 in the valve assembly 23 to move to a seat in opening 26, closing such opening. Communication of the vent chamber with the tank shell proper through the tube 22 accordingly is at this time cut off, venting of the normal upper portion of the tank continuing to take place, however, through the tube 21 and valve assembly 24. Similarly, limited upward tilting movement of the tank enables valve assembly 24 to close with venting continuing through tube 22. Should the tilting motion of the tank in either direction continue through a 90° attitude both valve assemblies close and venting is by way of the tube 18 or 19 depending upon whether the attitude assumed is an upward one (climb) or downward one (dive). Thus the valve assemblies 23 and 24 allow a free venting of the normal upper portion of the tank in a normal tank attitude through both tubes 21 and 22, permit venting through one or the other of the tubes during angular movement of the tank to a 90° position, and close to disconnect the vent chamber from the tank interior by way of the tubes 21 and 22 in the event of continued angular movement of the tank through and beyond the 90° position.

What is claimed is:

1. A vent system for a tank assuming in use different attitudes relative to the earth's surface, including a tank shell having normal upper and normal lower interior portions as well as having forward and rearward interior portions with regard to the direction of movement of the tank in normal use, means defining a vent chamber in the normal upper portion of the tank shell interior, an outlet to the tank shell exterior from said vent chamber, individual tubes connecting said vent chamber to the normal lower portion of the tank shell interior, in respective forward and rearward portions thereof, said tubes being continuously open, individual tubes connecting said vent chamber to the normal upper portion of the tank shell interior, in respective forward and rearward portions thereof, and individual valves controlling flow through said last mentioned tubes, said valves each comprising a cage and a gravity responsive rolling ball therein, said cages being angularly disposed relative to one another whereby one of said balls responds to longitudinal upward tilting motion of the tank shell while the other responds to longitudinal downward tilting motion of the tank shell.

2. A vent system for a tank assuming in use different attitudes relative to the earth's surface, including a tank shell having normal upper and normal lower interior portions as well as having forward and rearward interior portions with regard to the direction of movement of the tank in normal use, interior wall means defining in the normal upper portion of the tank shell interior an elongated vent chamber having its ends extending respectively into forward and rearward interior portions of the tank shell and spaced from corresponding walls of the tank shell, an outlet to the tank shell exterior from said vent chamber, a pair of individual tubes connecting said vent chamber to the normal upper portion of the tank shell interior, said tubes having inner ends terminating in the vent chamber and outer ends terminating outside the vent chamber between the ends thereof and the tank shell, said tubes overlapping one another within the vent chamber to place the inner end of one tube rearwardly in the vent chamber while the outer end thereof projects into the forward portion of the tank shell interior and to place the inner end of the other tube forwardly in the vent chamber while the outer end thereof projects into the rearward portion of the tank shell interior, gravity responsive valves at the inner ends of said tubes closing respectively in response to upward and downward longitudinal tilting motions of the tank shell, and another pair of tubes communicating at their one ends with the interior of the vent chamber and extending at their opposite ends into respective forward and rearward portions of the tank shell interior in the normal lower portion thereof.

3. A vent system according to claim 2, characterized in that said valves are arranged both to be closed in response to motion of the tank through and beyond a 90° attitude irrespective of the direction of such motion.

References Cited in the file of this patent
UNITED STATES PATENTS 2,774,365    Stewart _____ Dec. 18, 1956
2,889,843    Simcock _____ June 9, 1959